June 26, 1962     E. J. SVENSON     3,040,852
POWER TRANSMISSION FOR AUTOMOTIVE VEHICLES AND THE LIKE
Filed March 18, 1959     4 Sheets-Sheet 1

INVENTOR.
Ernest J. Svenson
BY Olson & Trexler
attys.

June 26, 1962  E. J. SVENSON  3,040,852
POWER TRANSMISSION FOR AUTOMOTIVE VEHICLES AND THE LIKE
Filed March 18, 1959  4 Sheets-Sheet 4

INVENTOR.
Ernest J. Svenson
By: Olson & Trexler
attys

United States Patent Office 3,040,852
Patented June 26, 1962

3,040,852
POWER TRANSMISSION FOR AUTOMOTIVE
VEHICLES AND THE LIKE
Ernest J. Svenson, Rockford, Ill., assignor to Odin Corporation, Rockford, Ill., a corporation of Illinois
Filed Mar. 13, 1959, Ser. No. 800,236
9 Claims. (Cl. 192—3.2)

My invention relates to power transmissions incorporating hydraulic torque converters adapted for use in automotive vehicles and the like to transmit power from a prime mover, such as an internal combustion engine, to a driven structure such as vehicle driving wheels.

The characteristics of hydraulic torque converters used in transmissions of the type to which my invention is directed are such that when the transmission is idle the hydraulic fluid tends to drain away from the torque converter leaving it only partially filled when the transmission is again put into operation. Hence, it is necessary to completely refill or flood the hydraulic torque converter with fluid under pressure to render it capable of transmitting torque at its full rated capacity and with maximum efficiency.

One object of my invention is to provide an improved power transmission of the above character incorporating a hydraulic torque convertor which is controlled by simple and extremely efficient control means which provides not only extremely efficient acceleration and driving of the driven structure but also makes highly efficient and advantageous use of the hydraulic torque converter for braking or decelerating the structure normally driven through the transmission.

Another object of my invention is to provide a power transmission as recited in the above object, which upon being started after remaining idle for extended periods is rendered immediately effective to transmit power through its hydraulic torque converter with the latter operating at its maximum efficiency.

A further object of my invention is to provide an improved power transmission as recited in the above objects which upon being started is rendered immediately and fully effective by the immediate filling of the hydraulic torque converter with hydraulic fluid under pressure supplied from an extremely simple and highly efficient fluid supply unit which functions during normal operation of the transmission to supply fluid under a relatively high pressure for operating hydraulic controls incorporated into the transmission and for supplying fluid under a reduced pressure for lubrication and for continuously replacing any fluid lost from the torque converter.

Another object of the invention is to provide a power transmission as set forth in the preceding objects, having improved hydraulic control structure which assures an uninterrupted flow of power through the transmission when shifting into direct drive after driving through the torque converter.

Other objects and advantages will become apparent from the following description of my invention taken with reference to the accompanying drawings, in which.

Mechanical Structure of Transmission

Figure 1:
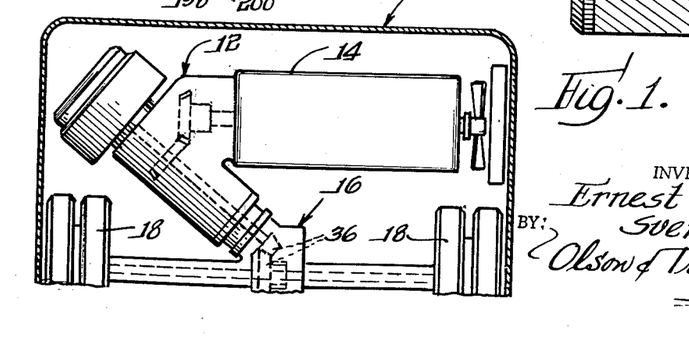
FIG. 1 is a fragmentary sectional view of the rear end of a bus showing an installation of my improved transmission.

As shown in FIG. 1 an improved power transmission 12 constructed in accordance with my invention is installed in the rear end of a bus 10 to connect the engine 14 with the differential 16 which powers the driving wheel 18. The transmission 12 is controlled from the driver's position (not shown) in the front of the bus.

Figure 2:
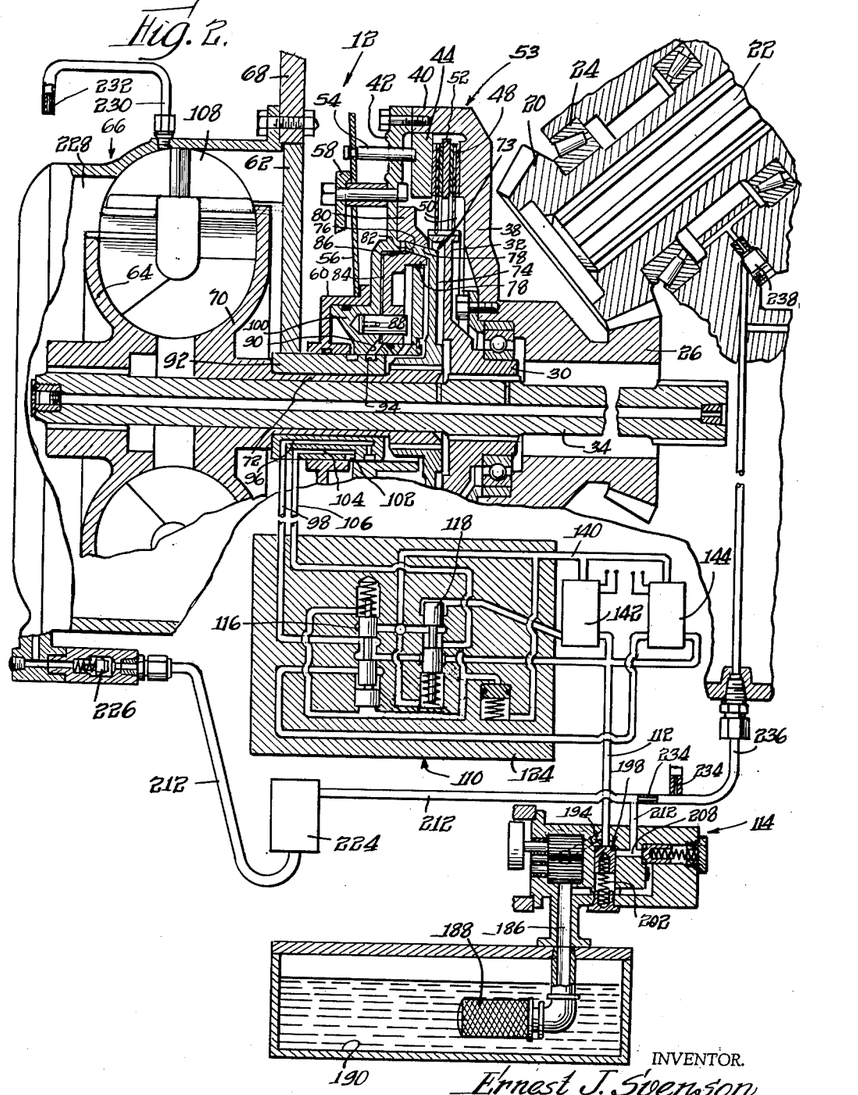
FIG. 2 shows a simplified longitudinal sectional view of the transmission together with sectional views of hydraulic transmission control structure and fluid pressure supply means associated with the transmission.

Structurally the transmission 12 comprises, as shown in transverse section in FIG. 2, a bevel gear 20 splined to a drive shaft 22 from the engine 14 and journaled by antifriction bearings 24. The gear 20 meshes with a bevel gear 26 journalled by an antifriction bearing on the hub 30 of a clutch disc 32 splined on a central driven shaft 34 of the transmission.

The right hand end of the driven shaft 34, with reference to FIG. 2, connects with the differential 16 through suitable connecting means, which for the purpose of illustration is formed by bevel gears 36, FIG. 1.

The left end of the body of the gear 26 is secured to a centrally apertured clutch plate 38 to support and drive the plate by engine torque.

A circumferential flange 40 integral with the periphery of the clutch plate 38 extends to the left as shown in FIG. 2 to connect with and support the periphery of an annular clutch housing plate 42. An annular pressure plate 44 is splined to the clutch plate flange 40 just inside the clutch housing plate 42. The pressure plate 44 opposes an annular friction surface 48 on the clutch plate 38. A pair of annular friction discs 50 splined to the periphery of the driven clutch disc 32 extend radially outward between the pressure plate 44 and the friction surface 48. A flat annular friction element 52 splined to the flange 40 extends between the two friction discs 50.

To establish a direct drive to the output shaft 34 the pressure plate 44 is moved toward the driving clutch plate 38 by hydraulic control means, to be presently described, to frictionally clamp the discs 50 and hence the disc 32 to the clutch plate 38. This direct drive clutch structure is designated generally by the numeral 53.

The pressure plate 44 is actuated by a circumferential series of axial pressure pins 54 (only one of which is shown in FIG. 2) extending through the clutch housing plate 42. Each pin 54 is actuated by a lever 56 medially pivoted on a fulcrum supported on the housing plate 42 as shown.

The end of each actuating lever 56 opposite the pin 54 engages an axially movable direct drive clutch applying cylinder 60, which is hydraulically actuated as will be presently described.

The central transmission shaft 34 extends to the left through a transmission housing element 62, as shown in FIG. 2, to connect with the driven turbine wheel 64 of a hydraulic torque converter 66 mounted on the transmission housing 68. The driving impeller 70 of the torque converter 66 connects with a quill shaft 72 extending to the right into adjacent relation to the driven clutch disc 32.

To drive the transmission output shaft 34 through the torque converter 66 the quill shaft 72 is driven through a hydraulically controlled clutch coupling to the engine driven housing plate 42.

As shown the clutch 73 used to drive the torque converter 66 comprises a driven disc 74 splined to the right end of the quill shaft 72 and having a peripheral friction flange 76 shaped in the form of a truncated cone and extending between a conical friction surface 78 on an annular driving ring 80 attached to the inner face of the clutch housing plate 42 and a conical friction surface 82 on an annular clutch engaging piston 84. The annular piston 84 is carried in an annular cylinder 86 formed in the inner periphery of the clutch housing plate 42. A plurality of circumferentially spaced axial pins 88 are supported in the piston 84 and extend into the bottom of the cylinder 86 to transmit driving torque from the clutch housing plate 42 to the piston 84.

Control fluid admitted under pressure into the bottom of the cylinder 86 through a bore 90 moves the piston 84 to the right to clamp the friction element 76 of the driven disc 74 between the clutch driving surfaces 78, 82 to transmit power from the engine driven shaft 22 to the torque converter impeller 70.

Control fluid for engaging the torque converter drive clutch 73 is conducted to the bore 90, FIG. 2, through a manifold sleeve 92 nonrotatably supported on the housing element 62 and encircling the quill shaft 72 between the clutch disc 74 and the impeller 70. An annular groove 94 formed in the right end of the manifold sleeve 92 and communicating with the rotating valve bore 90 is connected through an axial bore 96 in the sleeve with a control fluid supply line 98.

As previously inferred, the clutch housing plate 42 has an inner periphery closely encircling the manifold sleeve 92 so as to form a substantially fluid type connection between the groove 94 and the bore 90.

The inner marginal edge of the clutch housing plate 42 is shaped as shown in FIG. 2 to form an axially fixed piston 100 extending into the previously mentioned clutch actuating cylinder 60 which embraces the piston 100 and closely encircles the manifold sleeve 92 as shown.

The cylinder 60 is moved to the left to engage the direct drive clutch 53 by control fluid admitted under pressure to the cylinder 60 through an annular groove 102 in the manifold sleeve 92 which connects through an axial sleeve bore 104 with a control fluid supply conduit 106.

*Operation of Transmission*

The transmission 12 is controlled from the driver's seat of the vehicle 10 through electrical and hydraulic controls to be presently described which supply control fluid under pressure to the lines 98 and 106 for engaging the torque converter clutch 73 and the direct drive clutch 53 respectively.

To place the transmission 12 in neutral, both control fluid lines 98, 106 are connected to exhaust releasing both clutches 53 and 73.

To start the vehicle 10 or to drive the vehicle under any condition in which it is desirable to increase the torque output of the shaft 34 relative to the torque input of the engine driven shaft 22, fluid is supplied under pressure through the line 98 to engage the torque converter clutch 73 to transmit power through the torque converter 66 to the output shaft 34.

After the vehicle has been accelerated to driving speed and torque multiplication in the converter 66 is unnecessary, the line 98 is connected to exhaust releasing the torque converter clutch 73 and control fluid is supplied under pressure to the line 106 to engage the direct drive clutch 53.

The transmission 12 also provides for an extremely effective braking of the vehicle 10 by utilizing the cumulative braking action or drag of the engine 14 and a highly effective drag created within the torque converter 66. To obtain this cumulative braking action, control fluid is supplied under pressure to both control lines 98, 106 to engage both the direct drive and the torque converter clutches 53, 73. This not only makes the drag of the engine 14 fully available for braking but creates turbulence within the torque converter 66, which is produced by movement of the impeller 70 and the turbine 64 relative to a nonrotating stator 108 in the torque converter. The resulting drag of this turbulence is cumulative with the engine drag to produce the effective braking desired.

*Structure of Transmission Control System*

As shown in FIG. 2 the control system for the transmission includes a hydraulic valve assembly 110 having outlets connecting with the clutch control lines 98, 106. The assembly 110 is supplied with operating fluid under a pressure of approximately sixty-five pounds per square inch through a supply conduit 112 leading from a fluid supply unit 114 to be presently described.

Figures 4, 6:
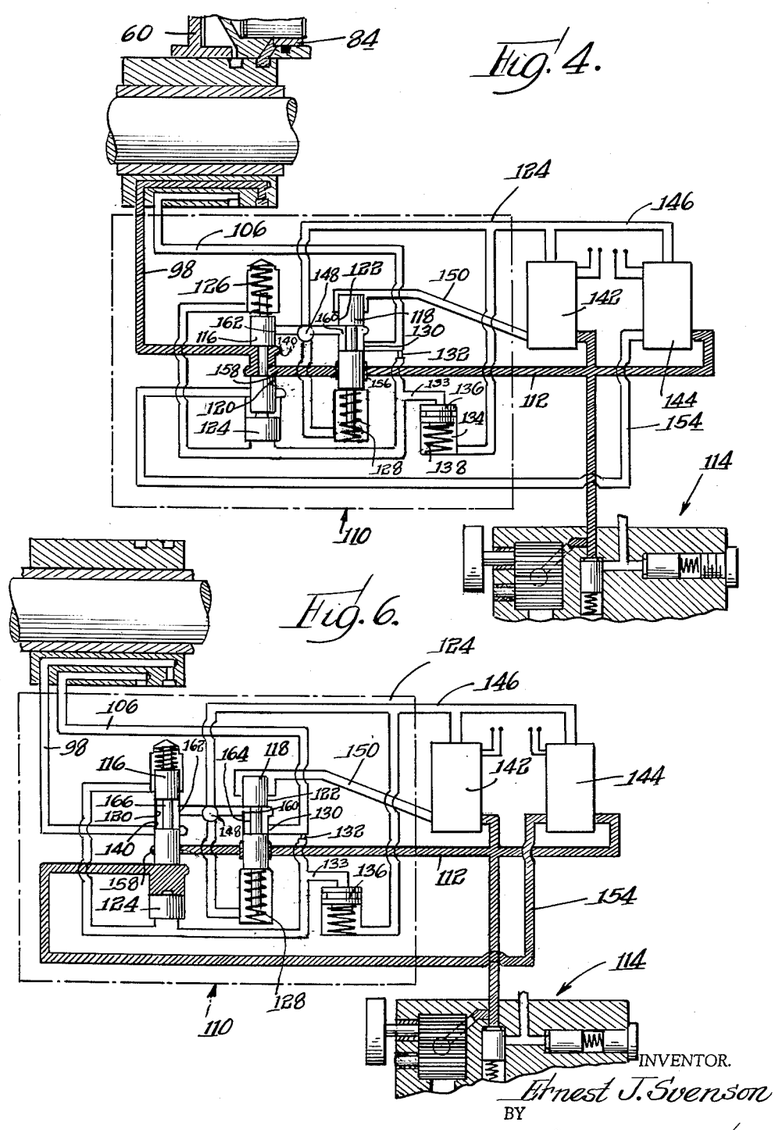
FIG. 4 is a generally schematic view showing the connections made through the hydraulic control structure from the fluid pressure supply unit to the transmission to condition the latter for driving through its torque convertor.
FIG. 6 is a view similar to FIG. 4 but showing the control structure conditioned to place the transmission in neutral.
Figures 5, 7:
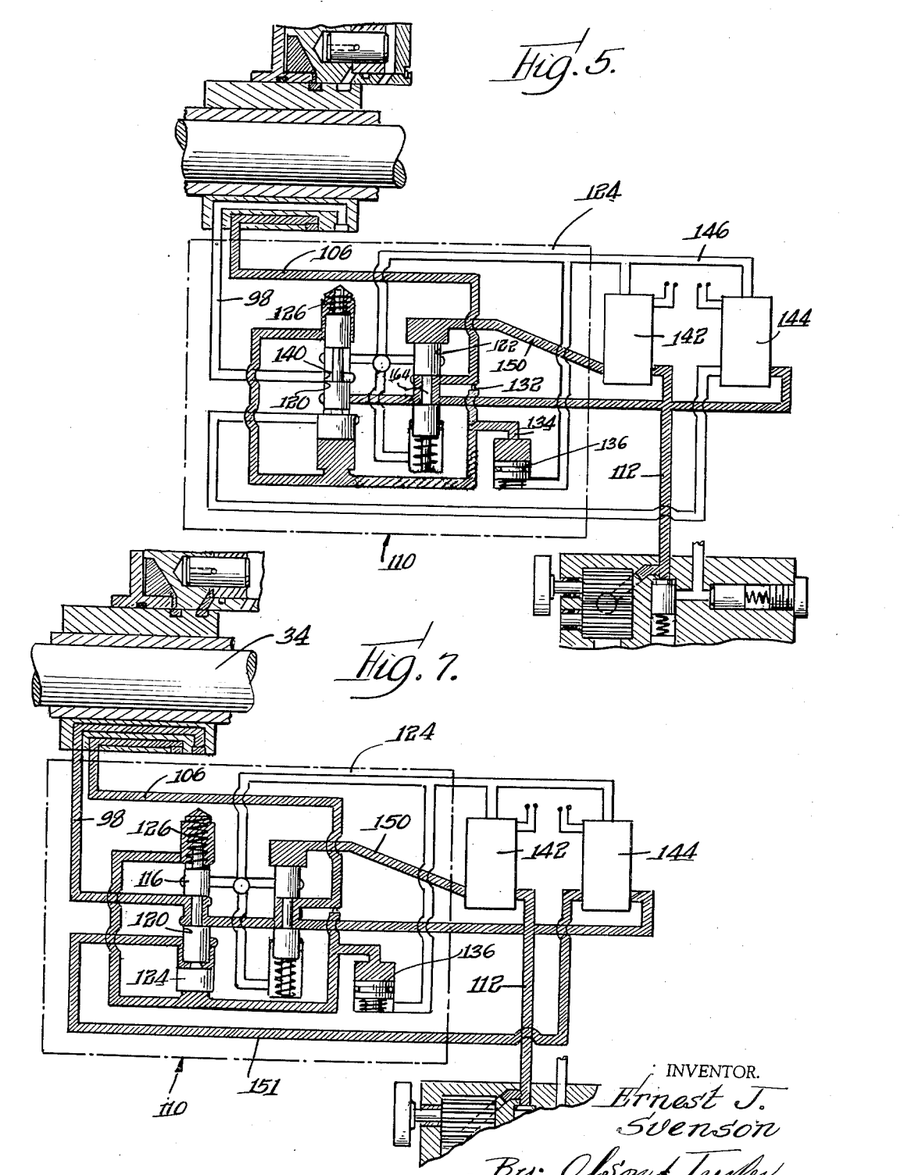
FIG. 5 is a view similar to FIG. 4 but illustrating the hydraulic control circuits which condition the transmission for effecting a direct mechanical drive therethrough.
FIG. 7 is a view similar to FIG. 4 but showing the hydraulic control circuits conditioned to effect braking through the transmission.

The control valve assembly 110 includes two slave valves comprising, respectively, two spool valve elements 116, 118, FIG. 2 slidably mounted in valve cylinders 120, 122, FIGS. 5 and 6, formed in the common valve housing 124, illustrated schematically in the drawings, FIGS. 2 and 4 to 7.

The lower end of the valve cylinder 120 is enlarged to have a diameter substantially greater than that of the valve element 116 and contains a free piston 124 shaped to engage a very small surface area of the lower end of the valve element 116, FIG. 4.

The valve element 116 is urged downwardly with reference to the drawings by a compression spring 126 contained in the enlarged upper end of the cylinder 120, FIG. 4. Similarly, the valve element 118 is urged upwardly by a spring 128 seated in the enlarged lower end of the cylinder 122.

For convenience in description, fluid passageways which are formed in part by bores in the valve housing 124 and in part by external conduits are designated by the same reference numerals throughout their entire length.

Thus the direct drive clutch control line 106 connects to a medial port 130 in the cylinder, FIGS. 4 and 5. A restricted flow orifice 132 connects the line 106 with a bore 133 leading to the enlarged upper end of the cylinder 120, to the enlarged lower end of the cylinder 120 below the free piston 124, and to the upper end of a time delay cylinder 134 containing a free piston 136 which is urged upwardly by a spring 138.

The torque converter clutch control line 98 connects to an annular enlargement 140 on the medial portion of the cylinder 120.

The fluid pressure supply line 112 connects to the inlet sides of two three-way solenoid operated master valves 142, 144. Both valves 142, 144 have an outlet connection to a return line 146 leading to an exhaust port 148 in the valve housing 124. A line 150 from the solenoid valve 142 connects to the upper end of the cylinder 122. A line 154 from the valve 144 connects with the enlarged lower end of the cylinder 120 above the free piston 124.

The main fluid pressure supply line 112 connects directly to an annular enlargement 156 of the cylinder 122 medially located below the port 130, FIG. 4. The pressure line 112 also connects directly to a port 158 opening into the cylinder 120 just below the port 140.

The previously mentioned exhaust port 148 also connects through the passageway or line 146 to an exhaust port 160 entering a medial portion of the cylinder 122 just above the port 130, FIG. 4. Similarly, the exhaust line 146 connects to an exhaust port 162 entering the cylinder 120 just above the port 140. A branch of the exhaust passageway or line 146 connects with the lower end of the time delay cylinder 134. Another branch of the passageway 146 connects the exhaust port 148 with the lower end of the cylinder 122.

*Operation of Transmission Control System*

The hydraulic connections made by the control system to place the transmission 12 in neutral position are illustrated in FIG. 6, in which fluid passages filled with control fluid under pressure are shaded and fluid passages connected to exhaust are unshaded.

Thus, to effect a neutral condition of the transmission the solenoid valve 142 is operated to connect the upper end of the cylinder 122 to exhaust, allowing the spring 128 to shift the valve element 118 to its upper position shown in FIG. 6. For this position of the valve 118, the port 130 communicates around a reduced diameter neck 164 of the valve 118 with the exhaust port 160 to connect the direct drive clutch control line 106 to exhaust.

At the same time the line 106 is cut off from the pressure line 112.

The solenoid valve 144 is set to supply operating fluid under pressure through the line 154 to the cylinder 120 between the floating piston 124 and the lower end of the valve 116 thus shifting the valve 116 to its upper operating position which cuts off the torque converter clutch control line 98 from the pressure line 112 and at the same time connects the line 98 to exhaust. This exhaust connection is made from port 140 to exhaust port 162 around a reduced diameter neck 166 of the valve 116.

Operation of the control system to condition the transmission 12 to drive through the torque converter 66 is illustrated in FIG. 4. Here the position of the solenoid valve 142 remains unchanged from its position when the transmission is in neutral. However, the solenoid valve 144 operates to connect the lower end of the cylinder 120 above the free piston 124 to exhaust, allowing the spring 126 to shift the valve 116 to its lower operating position, FIG. 4, where it closes off the exhaust port 162 and effects a connection of the torque converter clutch engaging control line 98 with the control pressure supply line 112.

The hydraulic connections made in the control system to establish a direct drive through the transmission are illustrated in FIG. 5. Here the position of the solenoid valve 144 remains unchanged from its position described in relation to driving through the torque converter, FIG. 4. The solenoid valve 142 is shifted to supply operating fluid to the upper end of the cylinder 122 to shift the valve 118 to its lower operating position where the valve neck 164 connects the pressure line 112 to the line 106 for engaging the direct drive clutch 53.

This engagement of the direct drive clutch 53 is followed by a gradual release of the torque converter drive clutch 73.

The fluid supplied to the direct drive clutch line 106 bleeds through the orifice 132 into the line 133 which communicates with the upper end of the cylinder 120 and with the lower end of the cylinder 120 below the free piston 124. Since the diameter of the free piston 124 exceeds that of the piston 116 the differential pressure of the fluid on the pistons 116 and 124 compresses the spring 126 to shift the valve 116 upwardly to its upper position shown in FIG. 5. This connects the clutch line 98 to exhaust in the same manner as previously described in relation to the hydraulic connections for placing the transmission in neutral, as illustrated in FIG. 6.

However, before this upward movement of the piston 116 can take place to disengage the torque converter clutch 73 it is necessary that sufficient fluid flow through the orifice 132 to fill the time delay cylinder 134 against the force of the relatively weak spring 138 in order for sufficient pressure to build up in the passageway 133 to compress the relatively strong spring 126.

The resulting delay in shifting the valve 116 to its upper position to release the torque converter clutch 73 assures an uninterrupted flow of power from the engine 14 to the transmission output shaft 34 when shifting into direct drive after driving through the torque converter 66.

The hydraulic connections for engaging both transmission clutches 53, 73 for braking are illustrated in FIG. 7. Here the solenoid valve 142 remains unchanged from its position previously described in relation to driving directly through the transmission, FIG. 5. But the solenoid valve 144 is operated to supply fluid under pressure to the lower end of the cylinder 120 between the free piston 124 and the valve 116. Thus the fluid pressure on opposite ends of both the free piston 124 and the valve 116 is neutralized allowing the spring 126 to shift the valve 116 to its lower position in which fluid is supplied to the clutch line 106 in the same manner described in relation to FIG. 4 which illustrates the hydraulic control circuit connections for direct drive.

In brief, the solenoid valve 142 controls movement of the valve 118 between its upper and lower positions in which it connects the direct drive clutch line 106 to exhaust and to the fluid pressure supply line 112 respectively. The valve 116 is moved between its lower position, FIG. 4, in which it supplies operating fluid to the torque converter clutch control line 98, to its upper position, which connects the clutch line 98 to exhaust, by operating fluid supplied through the solenoid valve 144 to the line 154 or by operating fluid supplied through the bleed orifice 132 to the line 133. Thus, upward shifting movement of the valve 116 is effected by supplying fluid under pressure to either the line 154, FIG. 6, or to the line 133, FIG. 5. However, fluid supplied under pressure to both the lines 133 and 154 results in shifting of the valve 116 to its lower position by the spring 126, FIG. 7.

*Fluid Pressure Supply Unit*

The previously mentioned fluid pressure supply unit 114, which supplies control fluid under pressure to the hydraulic control line 112, utilizes a single pump of simple economical construction to provide a continuous supply of hydraulic fluid under a relatively high pressure, approximately sixty-five pounds per square inch, for operating the hydraulic control system and to supply hydraulic fluid under a reduced pressure (approximately thirty-five pounds per square inch) for immediately refilling the torque converter 66 with operating fluid to its maximum capacity when the transmission 12 is first put into operation and for providing fluid under pressure for forced lubrication of bearings throughout the transmission.

The fluid pressure supply unit 114 is illustrated in a somewhat schematic fashion in FIG. 2 to more clearly reveal the manner in which major components are interconnected by hydraulic passages within the unit. The actual structure of the major portion of the fluid supply unit is illustrated in FIGS. 3, 8, 9, and 10.

Figure 3:
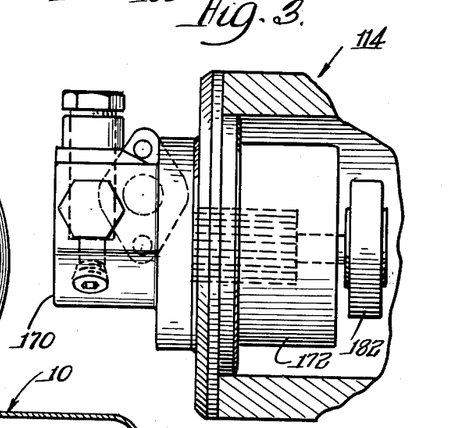
FIG. 3 is a side elevational viw of the fluid prssure supply unit incorporated into the transmission.
Figure 8:
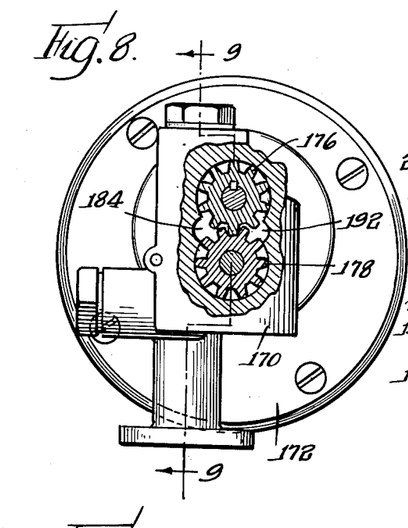
FIG. 8 is a left end view of FIG. 3 with certain parts broken away to reveal underlying pump structure.
Figure 9:
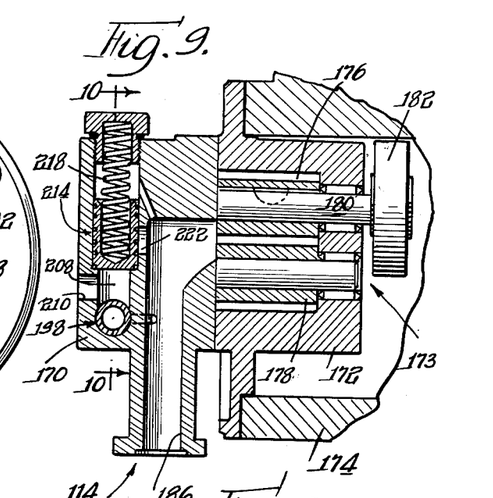
FIG. 9 is a sectional view taken along the line 9—9 of FIG. 8.

Thus as shown in FIGS. 3 and 9 the unit 114 comprises a fully integrated valve housing and manifold 170 affixed to one side of a gear pump housing 172 mounted in a portion of a casing 174. Two gears 176, 178 are mounted in the housing 172 as shown in FIGS. 8 and 9. They mesh with each other to form a gear pump 173 driven by a shaft 180 supporting the gear 176 and projecting from the casing end of the housing 172.

The shaft 180 is driven at a pumping speed, which may for example be twice the speed of the vehicle engine 14, by a suitable power drive (not shown) from the engine which rotates the shaft 180 through a driver 182 mounted on the projecting end of the shaft as shown.

Hydraulic fluid is supplied to an intake chamber 184 in the pump housing 172, FIG. 8, through an intake passage 186, FIG. 9, in the manifold 107 which connects as shown in FIG. 2 with a fluid intake filter 188 in a fluid reservoir 190.

Figure 10:
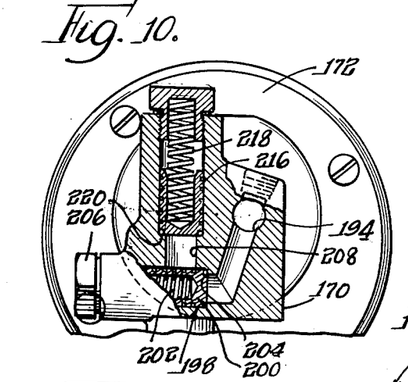
FIG. 10 is a sectional view taken generally along the line 10—10 of FIG. 9.

The gears 176, 178 pump fluid from the intake chamber 184 to an output chamber 192, FIG. 8 which communicates with a high pressure bore 194 in the manifold 170, FIG. 10. As shown in FIG. 2 the high pressure manifold bore 194 connects with the control fluid supply line 112.

The pressure of fluid in the bore 194 and hence in the supply line 112 is limited to a predetermined maximum value of sixty-five pounds per square inch by a high pressure modulator valve 198 mounted within the manifold 170 as shown in FIGS. 9 and 10. Structurally, the high pressure modulator valve 198 comprises a plunger 200 biased by a spring 202 toward an annular valve seat 204 communicating with the high pressure bore 194. A seat 206 for one end of the spring 200 is threaded into the manifold 170. Fluid pressure in the bore 194 in excess of sixty-five pounds per square inch opens the modulator valve 198 to communicate with a low pressure bore 208 formed within the manifold 170 as shown.

This low pressure bore 208 communicates through an opening 210, FIG. 9 with a low pressure line 212, FIG. 2 leading to the torque converter 66 and to spaced lubricating points as will be presently described.

The fluid pressure within the low pressure bore 208 is limited to a reduced pressure level of the order of thirty-five pounds per square inch by a low pressure modulator valve 214 mounted in the manifold 170 and comprising, as shown in FIGS. 9 and 10, a plunger biased by a compression spring 218 toward a valve seat 220 communicating with the bore 208. When the pressure within the bore 208 exceeds a predetermined value, as mentioned, the low pressure modulator valve 214 opens to allow fluid to escape back into the intake bore 186 through an exhaust bore 222, FIG. 9.

*Structure and Operation of Fluid Pressure Supply System*

The volumetric output capacity of the gear pump 173 is such that immediately upon starting of the vehicle engine 12 it produces an overflow of fluid pressure through the high pressure modulator valve 198 to the low pressure supply conduit 212 shown in FIG. 2. This conduit 212 leads through a filter 224 and through a check valve 226 to the interior of the torque converter 66.

As previously indicated it is impractical to completely seal the torque converter 66 against leakage. This leakage is not so much a complete loss of hydraulic fluid from the overall transmission as it is a drainage of hydraulic fluid from toroidal chamber 228, containing the impeller 70 and turbine 64, back into other parts of the transmission. In any event, the torque converter 66 is not filled to capacity after it has been standing idle for a substantial period.

But immediately upon starting of the engine 14, the fluid supply unit 114 supplies fluid at a high volumetric rate at a pressure of approximately thirty-five pounds per square inch to immediately fill the torque converter 66 to capacity thus enabling the transmission to go into operation without delay with the torque converter 66 functioning at its full capacity and maximum efficiency.

Any air entrapped in the torque converter 66 is bled off through a bleed tube 230 connected to the top of the toroidal chamber 228 and extending back to the reservoir 190 through a small bleed orifice 232 through which hydraulic fluid is normally circulated from the supply line 212.

The relatively low pressure hydraulic supply line 212 is also connected through restricted orifices 234 with lines 236 leading to lubricant distributing fittings 238, one of which, as shown in FIG. 2, directs fluid to the bearings 24, for example.

It will be appreciated that my invention is not necessarily limited to the embodiment illustrated but includes equivalent embodiments and alternatives falling within the spirit and scope of the invention as defined by the appended claims.

The invention is claimed as follows:

1. A mechanical power transmission, comprising, in combination, a rotary driving member, a rotary driven member, a direct drive clutch for connecting said driving member to said driven member, a hydraulic torque converter having an output side connected to said driven member, a torque converter clutch for connecting the input side of said torque converter to said driving member, two hydraulic actuators for controlling said respective clutches, hydraulic control means for controlling said clutch actuators and including a pair of hydraulically controlled valves for connecting said respective actuators either to exhaust or to a supply of operating fluid under pressure, hydraulic means interconnecting said control valve for said direct drive clutch actuator with said control valve for said torque converter clutch actuator to disengage said torque converter clutch as an incident to engagement of said drive clutch, said hydraulic means interconnecting said control valves including time delay means for delaying disengagement of said torque converter clutch after engagement of said direct drive clutch, a hydraulic fluid pressure supply unit including a pump therein having an output side connected to supply fluid under a relatively high pressure to said control means, a high pressure modulator valve having an inlet side connected to said pump outlet to limit the pump outlet pressure to a predetermined relatively high value, a low pressure modulator valve having an inlet side connected to the outlet side of said high pressure modulator valve and having an outlet side connected to exhaust to limit the fluid pressure on the outlet side of said high pressure modulator valve to a predetermined relatively low value, and means connecting the outlet side of said high pressure modulator valve to said torque converter for filling the latter immediately upon starting the said pump.

2. For use in an automotive vehicle or the like, a mechanical power transmission comprising, in combination, a driving member, a driven member, a direct drive clutch for connecting said driving and driven members, a first hydraulic actuator for said direct drive clutch, a torque converter for transmitting power from said driving member to said driven member, a torque converter clutch for controlling driving of said driven member through said torque converter, a second hydraulic actuator for controlling said torque converter clutch, first hydraulic control means for supplying control fluid under pressure to said first actuator, second hydraulic control means for supplying operating fluid to said second actuator to control said torque converter clutch, a hydraulic fluid pressure supply unit including a hydraulic pump therein having an output side connected to supply fluid under a relatively high pressure to said control means, a high pressure modulator valve having an inlet side connected to said pump outlet to limit the pump outlet pressure to a predetermined relatively high value, a low pressure modulator valve having an inlet side connected to the outlet side of said high pressure modulator valve and having an outlet side connected to exhaust to limit the fluid pressure on the oulet side of said high pressure modulator valve to a predetermined relatively low value, means connecting the outlet side of said high pressure modulator valve to said torque converter for filling the latter immediately upon starting of said pump, and hydraulic means including hydraulic time delay means interconnecting said first and second hydraulic control means to respond automatically to operation of said first control means which effects engagement of said direct drive clutch to effect a delayed operation of said second control means to interrupt driving through said torque converter.

3. For use in an automotive vehicle, or the like, a power transmission comprising, in combination, a rotary driving member, a rotary driven member, a direct drive clutch for connecting said driving and driven members, a hydraulic torque converter connected to said driven member, a torque converter clutch for connecting said torque converter to said driving member, hydraulic actuators for said respective clutches, hydraulic control means for supplying control fluid under pressure to said clutch actuators selectively, a hydraulic fluid pressure supply unit including a hydraulic pump therein having an output side connected to supply fluid under a relatively high pressure to said control means, a high pressure modulator valve having an inlet side connected to said pump outlet to limit the pump outlet pressure to a predetermined relatively high value, a low pressure modulator valve having an inlet side connected to the outlet side of said high pressure modulator valve and having an outlet side connected to exhaust to limit the fluid pressure on the outlet side of said high pressure modulator valve to a predetermined relatively low valve, means connecting the outlet side of said high pressure modulator valve to said torque converter for filling the latter immediately upon starting of said pump, means defining a restricted flow bleed orifice communicating with the interior of said torque converter through the top thereof to provide for the escape of air from the interior of the torque converter, and means including restricted flow orifice means connecting the outlet side of said high pressure modulator valve to spaced lubrication points within the transmission.

4. For use in an automotive vehicle, or the like, a power transmission comprising, in combination, a rotary driving member, a rotary driven member, a direct drive clutch for connecting said driving and driven members, a hydraulic torque converter connected to said driven member, a torque converter clutch for connecting said torque converter to said driving member, hydraulic actuators for said respective clutches, hydraulic control means for supplying control fluid under pressure to said clutch actuators selectively, a hydraulic fluid pressure supply unit including a hydraulic pump encased in a pump housing and a valve manifold secured to said pump housing, a high pressure modulator valve encased in said valve manifold and having an inlet side connected to said pump outlet to limit the pump outlet pressure to a predetermined relatively high value, means connecting the outlet of said pump and the inlet side of said high pressure valve to said hydraulic control means for supplying control fluid to the latter under a relatively high pressure, a low pressure modulator valve encased in said valve manifold and having an inlet side connected to the outlet side of said high pressure modulator valve to limit the fluid pressure on the outlet side of said high pressure modulator valve to a predetermined relatively low value, means connecting the outlet side of said high pressure modulator valve and the inlet side of said low pressure modulator valve to said torque converter for filling the latter immediately upon starting of said pump, and means defining a restricted flow bleed orifice communicating with the interior of said torque converter through the top thereof to provide for the escape of air from the interior of the torque converter.

5. For use in an automotive vehicle, or the like, a power transmission comprising, in combination, a rotary driving member, a rotary driven member, a direct drive clutch for connecting said driving member to said driven member, a hydraulic torque converter, means including a first hydraulic transmission actuator for effecting the driving of said driven member from said driving member through said torque converter, a first control valve for said first hydraulic actuator movable between a first position in which said hydraulic actuator is operated to effect driving of said driven member through said torque converter and a second position in which said hydraulic actuator is operated to discontinue driving of said driven member through said torque converter, a spring biasing said control valve to said first position thereof, a hydraulic valve actuator defining a pressure cylinder and including means coacting with said first control valve to shift the latter to said second position thereof as an incident to admission of fluid into said pressure cylinder, a second hydraulic transmission actuator for effecting driving of said driven member through said direct drive clutch, a second control valve for supplying fluid under pressure to said second hydraulic transmission actuator to operate the latter to engage said direct drive clutch, means including a restricted flow bleed orifice connecting the discharge side of said second control valve with said valve actuator pressure cylinder to bleed fluid into the latter as an incident to the supplying of operating fluid to said second hydraulic transmission actuator to engage said direct drive clutch, means defining an expansible time delay cylinder of substantial yet limited volume connected to the pressure cylinder side of said bleed orifice to receive fluid therefrom, and means tending to contract said time delay cylinder.

6. For use in an automotive vehicle, or the like, a power transmission comprising, in combination, a rotary driving member, a rotary driven member, a direct drive clutch for connecting said driving member to said driven member, a hydraulic torque converter, means including a first hydraulic transmission actuator for effecting the driving of said driven member from said driving member through said torque converter, a first control valve for said first hydraulic actuator movable between a first position in which said hydraulic actuator is operated to effect driving of said driven member through said torque converter and a second position in which said hydraulic actuator is operated to discontinue driving of said driven member through said torque converter, a spring biasing said control valve to said first position thereof, a hydraulic valve actuator defining a pressure cylinder and including means coacting with said first control valve to shift the latter to said second position thereof as an incident to admission of fluid into said pressure cylinder, a second hydraulic transmission actuator for effecting driving of said driven member through said direct drive clutch, a second control valve for supplying fluid under pressure to said second hydraulic transmission actuator to operate the latter to engage said direct drive clutch, and means including a restricted flow bleed orifice connecting the discharge side of said second control valve with said first valve actuator pressure cylinder to bleed fluid into the latter as an incident to the supplying of operating fluid to said second hydraulic actuator to engage said direct drive clutch.

7. For use in an automotive vehicle, a power transmission comprising, in combination, a rotary driving member, a rotary driven member, a direct drive clutch for connecting said driving and driven members, a hydraulic torque converter, a clutch for effecting the driving of said driven member from said driving member through said torque converter, a first hydraulic transmission actuator for controlling said torque converter clutch, hydraulic control means including a first slave valve connected to control said first transmission actuator and having a clutch engaging position and a clutch disengaging position, spring means urging said first slave valve to the clutch engaging position thereof, a first hydraulic valve actuator for urging said slave valve to said clutch disengaging position thereof, a second hydraulic valve actuator for urging said slave valve to the clutch disengaging position thereof, said first and second hydraulic valve actuators being related to each other to mutually neutralize each other and allow said spring to move said slave valve to the clutch engaging position thereof, a second hydraulic transmission actuator for effecting driving of said driven member through said direct drive clutch, a second slave valve for controlling said second transmission actuator and having a clutch engaging position and a clutch disengaging position, spring means urging said second slave valve to the clutch disengaging position thereof, a third hydraulic actuator for shifting said second slave valve to the clutch engaging position thereof, a first master valve connected to said first hydraulic actuator to controllably energize the latter, a second master valve connected to said third hydraulic valve actuator to controllably energize the latter, means interconnecting said second hydraulic valve actuator with said third hydraulic valve actuator to energize said second valve actuator as an incident to energization of said third valve actuator, and said first and second master valves being controllably operable to energize said first, second and third valve actuators simultaneously to effect operation of both said first and second hydraulic transmission actuators to effect braking through said transmission.

8. An automotive vehicle transmission, comprising, in combination, a rotary driving member, a rotary driven member, a first clutch for connecting said driving member to said driven member, a hydraulic torque converter, a second clutch for connecting said driving member to said driven member through said torque converter, a slave valve for controlling said second clutch and having a clutch engaging portion and a clutch disengaging position, spring means urging said slave valve to the clutch engaging position thereof, differential piston means for moving said first slave valve to the clutch disengaging position thereof, said differential piston means including two separable piston sections, first conduit means for supplying fluid under pressure to opposite ends of said differential piston means simultaneously to move said slave valve to the clutch disengaging position thereof, second conduit means for supplying fluid under pressure to said differential piston between said piston sections thereof to urge said slave valve to the clutch dissengaging position thereof, first control valve means for supplying fluid to one of said conduit means to shift said slave valve to the clutch disengaging position thereof, second control valve means interconnected with said first clutch to control engagement thereof, means interconnecting said second control valve means with the other of said conduit means to shift said slave valve to the clutch disengaging position thereof as an incident to engagement of said first clutch, and said first and second control valve means being operable simultaneously to engage said first clutch and to supply fluid to both said conduit means to effect movement of said slave valve to said clutch engaging position thereof by said spring means.

9. An automotive vehicle transmission, comprising, in combination, a rotary driving member, a rotary driven member, a first clutch for connecting said driving member to said driven member, a hydraulic torque converter, a second clutch for connecting said driving member to said driven member through said torque converter, a slave valve for controlling said second clutch and having a clutch engaging position and a clutch disengaging position, spring means urging said slave valve to one of said positions thereof, differential piston means for moving said first slave valve to the other position thereof, said differential piston means being formed in two separable piston sections, first conduit means for supplying fluid under pressure to opposite ends of said differential piston means simultaneously to move said slave valve to said other position thereof, second conduit means for supplying fluid under pressure to said differential piston between said piston sections thereof to urge said slave valve to said other position thereof, first control valve means for supplying fluid to one of said conduit means to shift said slave valve to said other position thereof, second control valve means interconnected with said first clutch to control engagement thereof, means interconnecting said second control valve means with the other of said conduit means to shift said slave valve to said other position thereof as an incident to operation of said first clutch, said first and second control valve means being operable simultaneously to operate said first clutch and to supply fluid to both said conduit means to effect movement of said slave valve to said one position thereof by said spring means, a hydraulic fluid pressure supply unit including a hydraulic pump therein having an output side connected to provide a supply of fluid under a relatively high pressure to both said control valve means, a high pressure modulator valve connected to said pump to limit the pump outlet pressure to a relatively high value, a low pressure modulator valve interconnected with said high pressure modulator valve to provide a supply of fluid under a relatively low pressure, means connecting said supply of low pressure fluid to said torque converter for filling the latter immediately upon starting of said pump, and means including restricted flow orifice means connecting said supply of low pressure fluid to spaced lubrication points within the transmission.

References Cited in the file of this patent

UNITED STATES PATENTS

| | | |
|---|---|---|
| 2,049,673 | Starr | Aug. 4, 1936 |
| 2,632,539 | Black | Mar. 24, 1953 |
| 2,645,137 | Roche | July 14, 1953 |
| 2,717,673 | Zeidler | Sept. 13, 1955 |
| 2,815,684 | Roche | Dec. 10, 1957 |
| 2,934,976 | Herndon | May 3, 1960 |

UNITED STATES PATENT OFFICE
CERTIFICATE OF CORRECTION

Patent No. 3,040,852            June 26, 1962

Ernest J. Svenson

It is hereby certified that error appears in the above numbered patent requiring correction and that the said Letters Patent should read as corrected below.

Column 1, line 68, for "viw" read -- view --; same line 68, for "prssure" read -- pressure --; column 11, line 30, for "portion" read -- position --.

Signed and sealed this 20th day of November 1962.

(SEAL)
Attest:

ERNEST W. SWIDER            DAVID L. LADD
Attesting Officer            Commissioner of Patents